United States Patent
Stent et al.

(10) Patent No.: US 11,221,671 B2
(45) Date of Patent: Jan. 11, 2022

(54) OPENGAZE: GAZE-TRACKING IN THE WILD

(71) Applicants: Toyota Research Institute, Inc., Los Altos, CA (US); Massachusetts Institute of Technology, Cambridge, MA (US)

(72) Inventors: Simon A. I. Stent, Cambridge, MA (US); Adrià Recasens, Cambridge, MA (US); Petr Kellnhofer, Cambridge, MA (US); Wojciech Matusik, Cambridge, MA (US); Antonio Torralba, Cambridge, MA (US)

(73) Assignees: TOYOTA RESEARCH INSTITUTE, INC., Los Altos, CA (US); MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 85 days.

(21) Appl. No.: 16/744,719

(22) Filed: Jan. 16, 2020

(65) Prior Publication Data
US 2020/0249753 A1    Aug. 6, 2020

Related U.S. Application Data

(60) Provisional application No. 62/799,565, filed on Jan. 31, 2019.

(51) Int. Cl.
*G06F 3/00* (2006.01)
*G06F 3/01* (2006.01)
(Continued)

(52) U.S. Cl.
CPC ......... *G06F 3/013* (2013.01); *G02B 27/0093* (2013.01); *G06N 3/08* (2013.01);
(Continued)

(58) Field of Classification Search
CPC . G06F 3/013; G06T 7/73; G06T 2207/30041; G06T 2207/30201; G02B 27/0093; G06N 3/08
See application file for complete search history.

(56) References Cited

U.S. PATENT DOCUMENTS 8,888,287 B2 * 11/2014 Yahav .................... G02B 27/01
351/210
10,027,888 B1 * 7/2018 Mackraz .............. H04N 13/383
(Continued)

FOREIGN PATENT DOCUMENTS

| CA | 2940241 A1 | 11/2015 |
| WO | 2018000020 A1 | 1/2018 |
| WO | 2018057947 A1 | 3/2018 |

OTHER PUBLICATIONS

Björn Browatzki, Heinrich H. Bülthoff and Lewis L. Chuang, "A comparison of geometric- and regression-based mobile gaze-tracking," https://www.ncbi.nlm.nih.gov/pmc/articles/PMC3986557/ Published: Apr. 8, 2014.

*Primary Examiner* — Khai M Nguyen
(74) *Attorney, Agent, or Firm* — Dinsmore & Shohl, LLP (57) ABSTRACT

A system includes a camera positioned in an environment to capture image data of a subject; a computing device communicatively coupled to the camera, the computing device comprising a processor and a non-transitory computer-readable memory; and a machine-readable instruction set stored in the non-transitory computer-readable memory. The machine-readable instruction set causes the computing device to perform at least the following when executed by the processor: receive the image data from the camera; analyze the image data captured by the camera using a neural network trained on training data generated from a 360-degree panoramic camera configured to collect image data of a subject and a visual target that is moved about an
(Continued)

environment; and predict a gaze direction vector of the subject with the neural network.

20 Claims, 5 Drawing Sheets

(51) Int. Cl.
  *G06N 3/08* (2006.01)
  *G06T 7/73* (2017.01)
  *G02B 27/00* (2006.01)
(52) U.S. Cl.
  CPC ...... *G06T 7/73* (2017.01); *G06T 2207/30041* (2013.01); *G06T 2207/30201* (2013.01)

(56) References Cited

U.S. PATENT DOCUMENTS

| | | | |
|---|---|---|---|
| 10,977,831 B2* | 4/2021 | Bazin | G06N 3/084 |
| 2016/0048964 A1 | 2/2016 | Kruglick | |
| 2019/0147607 A1* | 5/2019 | Stent | G06N 3/084 |
| | | | 382/103 |
| 2019/0317594 A1* | 10/2019 | Stent | G06F 3/017 |
| 2020/0089315 A1* | 3/2020 | Stent | G06N 3/0445 |
| 2021/0144413 A1* | 5/2021 | Lowry | G06T 3/4038 |

* cited by examiner

OPENGAZE: GAZE-TRACKING IN THE WILD

CROSS-REFERENCE TO RELATED APPLICATION

This application claims priority to U.S. Provisional Application No. 62/799,565 filed Jan. 31, 2019, the disclosure of which is incorporated herein by reference in its entirety.

TECHNICAL FIELD

The present specification generally relates to systems and methods for generating labeled training datasets for gaze estimation with error bounds. More specifically, the specification related to systems and methods for generating labeled training datasets for training neural networks to predict gaze estimation.

BACKGROUND

Vision is the primary sense with which humans perceive the surrounding world. By analyzing where a subject is looking, or in other words tracking the gaze or fixation of a subject, it is possible to learn about the attention, intention, and possible future actions of the subject.

Equipping machines (e.g., agents) with social intelligence is important in applications where they must observe and respond to human behavior. Common examples include self-driving cars and collaborative robots, which interact with or operate in very close proximity to humans.

To be socially intelligent, an agent must be able to observe and perceive certain aspects of other agents' behaviors. From a vision perspective, a critical task in order to interact with humans is to detect and track their bodies or faces in images. Recently, methods leveraging the representational power of deep convolutional neural networks and the ability to harness very large datasets have made progress towards these tasks. Human body landmark and pose tracking, particularly in 2D, has begun to reach high levels of robustness and efficiency. Supervised learning with deep networks on large datasets has shown to an approach for detecting other useful cues for acquiring social intelligence, such as verbal cues through improved audio-visual speech recognition and emotion estimation through observing facial expressions.

Another less commonly exploited cue is the human eye gaze. Eye gaze is a powerful non-verbal cue, signaling engagement, interest and attention during social interactions. Detecting and following where another person is looking is a skill developed early on in a child's life (e.g., four-month-old infants use eye gaze cuing to visually process objects) and helps to scaffold learning and collaboration by providing an additional feedback signal. Just as a parent's gaze can help to guide a child's attention, human gaze fixations have also been found to be useful in helping machines to learn or interact in various contexts.

Until now, gaze tracking has not been exploited with the same success as related problems such as body pose or face tracking. This is partially because of the difficulty of acquiring high enough resolution imagery around the eye to allow for its use in general applications. As very high resolution cameras become inexpensive and more commonplace, it seems likely that gaze tracking from RGB images in-the-wild will become increasingly useful. Perhaps more importantly, it is due to the lack of sufficiently large and variegated training data for the task. This is because collecting precise and highly varied gaze data, particularly outside of a lab environment, is challenging.

Accordingly, a need exists for collecting precise and highly varied gaze data generating labeled training datasets for training neural networks to predict a gaze of a subject.

SUMMARY

In one embodiment, a system includes a camera positioned in an environment to capture image data of a subject; a computing device communicatively coupled to the camera, the computing device comprising a processor and a non-transitory computer-readable memory; and a machine-readable instruction set stored in the non-transitory computer-readable memory. The machine-readable instruction set causes the computing device to perform at least the following when executed by the processor: receive the image data from the camera; analyze the image data captured by the camera using a neural network trained on training data generated from a 360-degree panoramic camera configured to collect image data of a subject and a visual target that is moved about an environment; and predict a gaze direction vector of the subject with the neural network.

In some embodiments, a method includes receiving image data from a camera positioned in an environment to capture image data of a subject, analyzing the image data with a neural network trained on training data generated from a 360-degree panoramic camera configured to collect image data of a study subject and a visual target that is moved about the environment, and predicting a gaze direction vector of the subject with the neural network.

In some embodiments, a system includes a camera positioned in an environment to capture image data of a subject, a computing device communicatively coupled to the camera, the computing device comprising a processor and a non-transitory computer-readable memory, a machine-readable instruction set stored in the non-transitory computer-readable memory. The machine-readable instruction set causes the computing device to perform at least the following when executed by the processor: receive the image data from the camera, analyze the image data captured by the camera using a neural network trained on training data comprising training image data of the one or more subjects and corresponding training gaze direction vectors generated by: collecting image data using a 360-degree panoramic camera of one or more subjects where gazes of the one or more subjects are fixed on a visual target that is moved about the environment, and calculating a corresponding training gaze direction vectors corresponding to the gazes of the one or more subjects. The machine-readable instruction set further causes the computing device to perform the following: predict, with the neural network, a gaze direction vector of the subject with the neural network and predict, with the neural network, error bounds based on a pinball loss function.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein include systems and methods for collecting precise and highly varied gaze data for training neural networks to predict a gaze of a subject. More specifically, embodiments described herein include systems and methods of generating 3D gaze training data for training a neural network which includes image data of subjects in an uncontrolled environment and corresponding gaze direction vector data that is automatically calculated. Embodiments also include systems and methods that employ a trained neural network to predict a gaze direction vector of a subject within received image data as well as predicting error bounds for the prediction. A pinball loss function is utilized for estimating gaze uncertainty bounds within the neural network. This is shown to be useful to estimate the likelihood of gaze fixation on particular objects in the environment (e.g., the scene of the image data).

Predicting the gaze direction vector of a subject has numerous applications, some of which include applications within autonomous driving systems, interactive household robotics, advertising, surveillance, and others. The precision of the gaze direction vector is a problem for which solutions continue to be developed and improved upon. The systems and methods described herein approach the issue from a unique angle. The gaze dataset described herein is generated in a natural uncontrolled environment ("in-the-wild"). That is, the image data that is captured includes backgrounds that would normally be captured by a camera employed in a practical application rather than image data captured within a controlled environment such as a studio or other controller environment. For example, typically, these datasets are captured using a static recording setup or a camera integrated in a smartphone. The static approach allows for more control and higher accuracy but lacks the diversity in illumination and motion blur of application data in-the-wild. Smartphone-based solutions have neither of these flaws and have the advantage of straightforward scaling via crowd-sourcing to increase the subject variety. However, those datasets can lack precision due to a reduced ability to direct and monitor subjects and gaze variability due to the collocation of the device's camera and gaze target (screen).

To truly capture the nature of human gaze in-the-wild, it has been found that it is important not to overly constrain the subject's pose, allowing for coverage over the full gamut of head and eyeball orientations in relation to the camera. The approach described herein uses at least one 360-degree camera with the goal of quickly acquiring many subjects at once, using a free-moving visual target rather than fixed target that allows image data to be captured across a full range of gaze directions. Moreover, the capture setup is mobile, which provides the ability to efficiently collect data from a broad demographic in more varied natural lighting environments, including a wider range of scale variation and image blur from subject motion during capture. This more closely approximates the domains of systems such as autonomous vehicles, robots, or behavioral experiments, which might benefit from the gaze tracking models described herein. By using a free-moving target, a much wider variety of gaze directions is able to be covered as compared to static controlled methods.

The two main families of gaze tracking methods are those which rely on 2D or 3D geometrical modeling of the eye and those which directly resolve gaze from image features. The first use corneal reflections of near infra-red light sources or other light sources with known geometry to fit a model of the eyeball from which gaze can be inferred. Since these methods rely on a relatively strong physical model, they generalize quite easily to the broader population, but at the cost of higher sensitivity to input noise such as partial occlusions or lighting interference. Since they also rely on a fixed light source, they are not feasible in unconstrained settings such as the model described herein.

The second family of appearance-based methods require large datasets of eye or face images in order to learn visual features that are useful for gaze tracking. Support vector regression, random forests and most recently deep learning have been used for this task. A preprocessing step of eye or face detection is often required. This reduces the effectiveness of such methods for the more oblique viewing angles considered in the setting described herein as the required features become occluded, even while one eye ball might remain sufficiently visible to estimate gaze. In contrast, the systems and methods described herein may only require the detection of the head, which can be performed with high robustness. Dependency between gaze and head pose can either be handled by the training implicitly or modeled explicitly, such as through a gaze transform layer implemented in a neural network, which facilitates the independent learning of eye direction and head pose in separate branches of a network. The systems and methods described herein do not try to explicitly separate the two since a goal of the model described herein is to avoid constraining the data capture in any way. In some embodiments, however, the model does capture the notion of head pose as a default for gaze estimate when the eye ball of a subject is no longer visible. Another discriminating feature of the model, which is employed by the systems and methods disclosed herein, is that, unlike other approaches that regress to a gaze output without a notion of accuracy, the present model performs quantile regression to output an accuracy estimate for its prediction via the use of a pinball loss function during training. This can be useful information for downstream systems to estimate certainty, such as the certainty of eye contact between a pedestrian and a driver of a vehicle.

Figure 1:
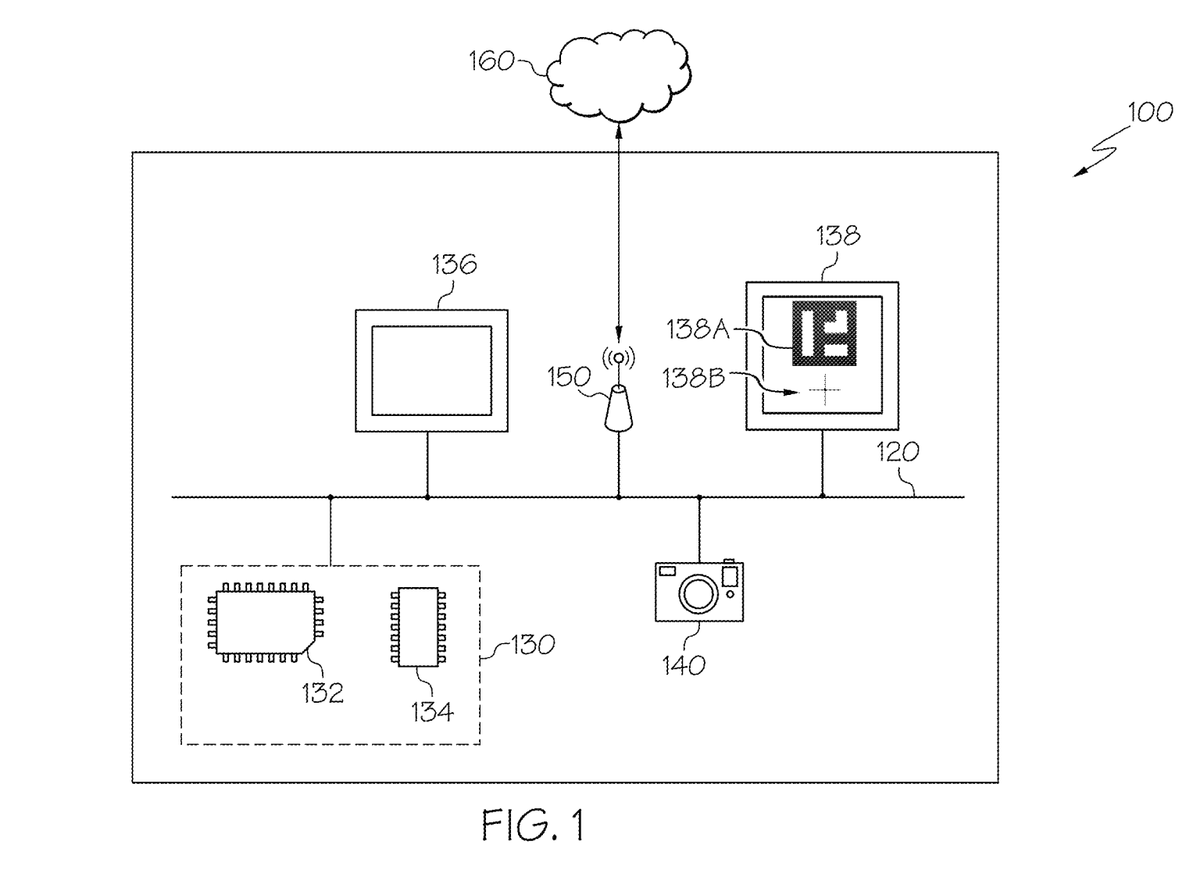
FIG. 1 depicts a system for automatically generating labeled training datasets for training a neural network to predict gaze estimation and error bounds jointly according to one or more embodiments shown and described herein.

Turning now to the drawings wherein like numbers refer to like structures, and particularly to FIG. 1, a system 100 for generating labeled training datasets and corresponding training gaze direction vectors for training neural networks to predict a gaze direction vector of a subject is depicted. In some embodiments, the system 100 may be employed in a training mode, that is configured to train a neural network, or in an application mode configured to capture image data and predict a gaze direction vector of a subject captured in the image data. The system 100 generally includes a communication path 120, a computing device 130 comprising a processor 132 and a non-transitory computer-readable memory 134, a display 136, a visual target 138, one or more cameras 140, and network interface hardware 150. The system 100 may be communicatively coupled to a network 160 by way of the network interface hardware 150. The components of the system 100 may be physically coupled or may be communicatively and operably coupled through the communication path 120 and/or the network 160. The various components of the system 100 and the interaction thereof will be described in detail herein.

The communication path 120 may be formed from any medium that is capable of transmitting a signal such as, for example, conductive wires, conductive traces, optical waveguides, or the like. The communication path 120 may also refer to the expanse in which electromagnetic radiation and their corresponding electromagnetic waves traverses. Moreover, the communication path 120 may be formed from a combination of mediums capable of transmitting signals. In one embodiment, the communication path 120 comprises a combination of conductive traces, conductive wires, connectors, and buses that cooperate to permit the transmission of electrical data signals to components such as processors 132, memories, sensors, input devices, output devices, and communication devices. Accordingly, the communication path 120 may comprise a bus. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 120 communicatively couples the various components of the system 100. As used herein, the term "communicatively coupled" means that coupled components are capable of exchanging signals with one another such as, for example, electrical signals via conductive medium, electromagnetic signals via air, optical signals via optical waveguides, and the like.

Still referring to FIG. 1, the computing device 130 may be any device or combination of components comprising a processor 132 and non-transitory computer-readable memory 134. The processor 132 of the system 100 may be any device capable of executing the machine-readable instruction set stored in the non-transitory computer-readable memory 134. Accordingly, the processor 132 may be an electric controller, an integrated circuit, a microchip, a computer, or any other computing device. The processor 132 may be communicatively coupled to the other components of the system 100 by the communication path 120. Accordingly, the communication path 120 may communicatively couple any number of processors 132 with one another, and allow the components coupled to the communication path 120 to operate in a distributed computing environment. Specifically, each of the components may operate as a node that may send and/or receive data. While the embodiment depicted in FIG. 1 includes a single processor 132, other embodiments may include more than one processor 132.

The non-transitory computer-readable memory 134 of the system 100 is coupled to the communication path 120 and communicatively coupled to the processor 132. The non-transitory computer-readable memory 134 may comprise RAM, ROM, flash memories, hard drives, or any non-transitory memory device capable of storing a machine-readable instruction set such that the machine-readable instruction set can be accessed and executed by the processor 132. The machine-readable instruction set may comprise logic or algorithm(s) written in any programming language of any generation (e.g., 1GL, 2GL, 3GL, 4GL, or 5GL) such as, for example, machine language that may be directly executed by the processor 132, or assembly language, object-oriented programming (OOP), scripting languages, microcode, etc., that may be compiled or assembled into machine readable instructions and stored in the non-transitory computer-readable memory 134. Alternatively, the machine-readable instruction set may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. While the embodiment depicted in FIG. 1 includes a single non-transitory computer-readable memory 134, other embodiments may include more than one memory module.

The system 100 comprises a display 136 for providing a visual output, for example, to project a target image to a subject, to project a prediction of the gaze direction vector in combination with the image data that was analyzed by the neural network, to project the error bounds or any other information pertaining to the operation or diagnostics of the system 100. The display 136 is coupled to the communication path 120. Accordingly, the communication path 120 communicatively couples the display 136 with other modules of the system 100. The display 136 may include any medium capable of transmitting an optical output such as, for example, a cathode ray tube, light emitting diodes, a liquid crystal display, a plasma display, or the like. Additionally, the display 136 may be the display 136 of a portable personal device such as a smart phone, tablet, laptop or other electronic device. Furthermore, the display 136 may be a television display mounted on a stand or on a wall to project target images (e.g., a single colored shape, such as a white circle) to a subject at a specified distance. Additionally, it is noted that the display 136 can include one or more processors 132 and one or more non-transitory computer-readable memories 134. While the system 100 includes a display 136 in the embodiment depicted in FIG. 1, the system 100, for example, in an application mode, may not include a display 136. That is, a display 136 may only be necessary while the system 100 is configured in the training mode.

Still referring to FIG. 1, the system 100, when in data collection portion of the training mode, includes a visual target 138. The visual target 138 may be any device, display, or object such as a sign that includes a registration tag 138A and/or a focus target 138B. The registration tag 138A may be any shape that may be visually captured by the camera 140. The registration tag 138A has a predefined dimensions and design that are known to the computing device. That is, through knowledge of the predefined dimensions and design the computing device is capable of determining the 3D location of the visual target 138 and more specifically the focus target 138B which is the focus of the subjects gaze during the data collection process of training the neural network. In other words, the design and known predefined dimensions of the visual target 138, more specifically, the registration tag 138A the 3D location of the visual target may be determined. The focus target 138B serves as a gaze fixation target for the data generating subjects while the registration tag is used for tracking the visual target 138 in 3D space.

Still referring to FIG. 1, the system 100 includes a camera 140. The camera 140 may be communicatively coupled to the communication path 120 and to the processor 132. The camera 140 may be any device having an array of sensing devices (e.g., pixels) capable of detecting radiation in an ultraviolet wavelength band, a visible light wavelength band, or an infrared wavelength band. The camera 140 may have any resolution. The camera 140 may be an omnidirectional camera, or a panoramic camera. In embodiments such as data collection embodiments for collecting and generating data for training the neural network the camera 140 may be a 360-degree panoramic camera, for example, but not limited to, a Ladybug5 distributed by FLIR Systems, Inc. In some embodiments, one or more optical components, such as a mirror, fish-eye lens, or any other type of lens may be optically coupled to the camera 140. In embodiments described herein, the camera 140 may provide image data of a subject or the subject and the environment around the subject to the computing device 130. In training mode, that is when collecting image data for training a neural network, the camera 140 may be positioned at a location to collect image data of one or more subjects, as described in more detail with respect to FIG. 3. In an application mode, the camera 140 may be positioned in an environment, for example, a vehicle cabin, on a robot, or in a room to capture image data of a subject, optionally including their eyes and/or head to determine a gaze direction of the subject. It should be understood that the camera 140 used in an application mode may be different than the camera 140 used in the data collection mode of training.

Still referring to FIG. 1, the system includes the network interface hardware 150 may include any wired or wireless networking hardware, such as a modem, LAN port, Wi-Fi card, WiMax card, mobile communications hardware, and/or other hardware for communicating with other networks and/or devices.

Figure 2:
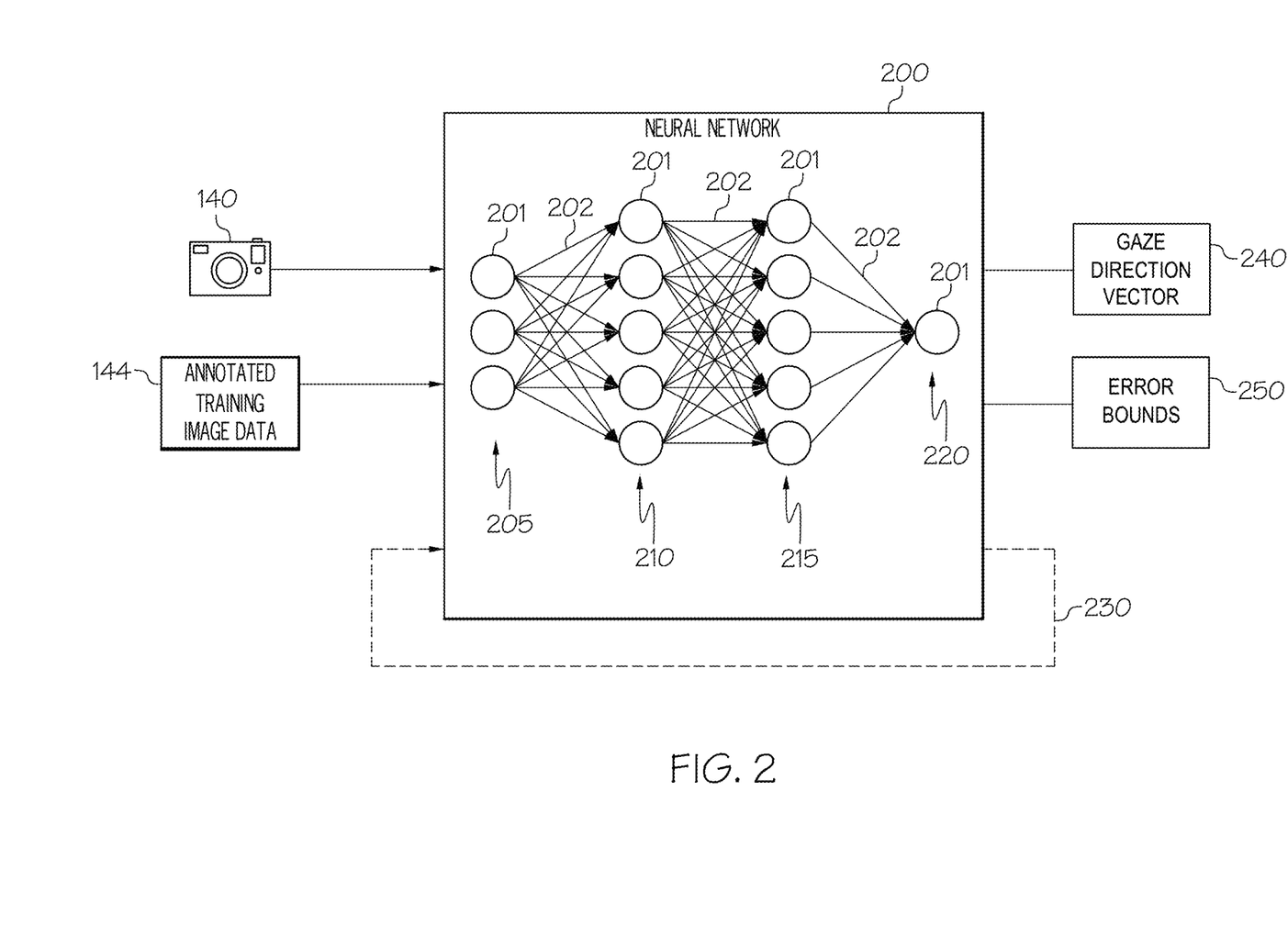
FIG. 2 depicts an illustrative diagram for the system implementing a neural network model for predicting gaze estimation and error bounds jointly according to one or more embodiments shown and described herein.

Referring now to FIG. 2, an illustrative diagram of the gaze model employed by the system 100 for predicting a gaze of a subject is depicted. Predicting gaze direction vectors or gaze-following in 360-degrees is an unbalanced problem. When the eyes are clearly visible, the problem is easy as eyes are very informative of gaze direction. However, when the eyes become partially or fully occluded, the estimation becomes significantly harder and eventually collapses to head pose estimation as a best guess. This imbalance constrains existing systems such as computer vision for a household robot or a driver awareness system in a vehicle that relies on gaze estimation because they typically provide point estimates of gaze direction and only within certain bounds. However, the gaze model described herein is a design configured to simultaneously predict error bounds along with a prediction of the gaze direction vector that an end-user or application system can use in a more measured way. By doing so, a continuous estimate of a subject's attention using the same model, regardless of their pose, is provided. This is important for natural tasks where the subject is free to move but a continuous estimate of their direction of attention is desired, for example in a store product/advertising tracking system that is configured to determine products a potential customer focuses on.

Turning to the gaze model depicted in FIG. 2, in some embodiments, for example in a training mode, the gaze model implements a neural network 200 that receives annotated training image data 144 that trains the neural network to predict gave direction vectors from images of subjects. The annotated training image data 144 includes image data of one or more subjects in-the-wild that is annotated with gaze direction vector information determined from image data captured by a 360-degree panoramic camera configured to collect image data of one or more subjects visually tracking a visual target 138 that is moved about an environment in-the-wild. The system configuration and method of data collection will be described in more detail with reference to FIGS. 3 and 4. In some embodiments, for example in application mode, the gaze model implements a neural network 200 that is trained to predict a gaze direction vector of a subject and/or predict error bounds based on a pinball loss function. The neural network may be trained using training data (e.g., annotated training image data 144) generated from a 360-degree panoramic camera configured to collect image data of a subject and a visual target that is moved about an environment in the manner described herein.

The neural network 200 may include one or more layers 205, 210, 215, 220, having one or more nodes 201, connected by node connections 202. The one or more layers 205, 210, 215, 220 may include an input layer 205, one or more hidden layers 210, 215, and an output layer 220. The neural network 200 may be a deep neural network, a convolutional neural network, or other type of neural network. The neural network 200 may include one or more convolution layers and one or more fully connected layers. The input layer 205 represents the raw information that is fed into the neural network 200. For example, image data captured from a camera 140, in an application mode, or annotated training image data 144, in a training mode, for training the neural network 200 may be input into the neural network 200 at the input layer 205. The image data from the camera input to the neural network 20 may have an image size (e.g., in pixels) of at least one of the following: 128×128, 227×227, and 384×384. However, these are only a few example image sizes, other may be have more or less pixels. In some embodiments, the image data is a head shot of the subject. In the training mode, there neural network 200 may employ one or more feedback or back-propagation techniques depicted by feedback loop 230 to train the neural network paths.

The neural network 200 processes the raw information received at the input layer 205 through nodes 201 and node connections 202. The one or more hidden layers 210, 215, depending on the inputs from the input layer 205 and the weights on the node connections 202, carry out computational activities. In other words, the hidden layers 210, 215 perform computations and transfer information from the input layer 205 to the output layer 220 through their associated nodes 201 and node connections 202.

In general, when a neural network 200 is learning, the neural network 200 is identifying and determining patterns within the raw information received at the input layer 205. In response, one or more parameters, for example, weights associated to node connections 202 between nodes 201, may be adjusted through a process known as back-propagation. It should be understood that there are various processes in which learning may occur, however, two general learning processes include associative mapping and regularity detection. Associative mapping refers to a learning process where a neural network 200 learns to produce a particular pattern on the set of inputs whenever another particular pattern is applied on the set of inputs. Regularity detection refers to a learning process where the neural network learns to respond to particular properties of the input patterns. Whereas in associative mapping the neural network stores the relationships among patterns, in regularity detection the response of each unit has a particular 'meaning'. This type of learning mechanism may be used for feature discovery and knowledge representation.

Neural networks possess knowledge that is contained in the values of the node connection weights. Modifying the knowledge stored in the network as a function of experience implies a learning rule for changing the values of the weights. Information is stored in a weight matrix W of a neural network. Learning is the determination of the weights. Following the way learning is performed, two major categories of neural networks can be distinguished: 1) fixed networks in which the weights cannot be changed (i.e., dW/dt=0), and 2) adaptive networks which are able to change their weights (i.e., dW/dt not=0). In fixed networks, the weights are fixed a priori according to the problem to solve.

In order to train a neural network 200 to perform some task, adjustments to the weights are made in such a way that the error between the desired output and the actual output is reduced. This process may require that the neural network 200 computes the error derivative of the weights (EW). In other words, it must calculate how the error changes as each weight is increased or decreased slightly. A back propagation algorithm is one method that is used for determining the EW.

The algorithm computes each EW by first computing the error derivative (EA), the rate at which the error changes as the activity level of a unit is changed. For output units, the EA is simply the difference between the actual and the desired output. To compute the EA for a hidden unit in the layer just before the output layer, first all the weights between that hidden unit and the output units to which it is connected are identified. Then, those weights are multiplied by the EAs of those output units and the products are added. This sum equals the EA for the chosen hidden unit. After calculating all the EAs in the hidden layer just before the output layer, in like fashion, the EAs for other layers may be computed, moving from layer to layer in a direction opposite to the way activities propagate through the neural network 200, hence "back propagation". Once the EA has been computed for a unit, it is straight forward to compute the EW for each incoming connection of the unit. The EW is the product of the EA and the activity through the incoming connection. It should be understood that this is only one method in which a neural network 200 is trained to perform a task.

Still referring to FIG. 2, the neural network 200 may include one or more hidden layers 210, 215 that feed into one or more nodes 201 of an output layer 220. There may be one or more output layers 220 depending on the particular output the neural network 200 is configured to generate. In the present embodiments, the outputs may include a predicted gaze direction vector 240. The gaze direction vector 240 may be defined by a spherical coordinate system or other three-dimensional gaze vector. The predicted gaze direction vector 240 may be vector data or may be a visual representation of the gaze direction vector displayed as an overly on the input image received from the camera 140.

In some embodiments, the neural network 200 may also output a predicted set of error bounds 250 corresponding to the predicted gaze direction vector 240. The error bounds 250 incorporate a pinball loss function. This aims to estimate the quantile distribution of the output of a regression problem. Existing neural networks configured for the task of gaze estimation do not consider error bounds. Considering error bounds makes a difference, as estimation noise is likely to be much higher when the eye is viewed from an oblique or side angle, or when one or more eyes are obscured (e.g. by glasses frames or mid-blink). In a classification setting, soft-max outputs are often used as a proxy for output confidence. However, in a regression setting this inference becomes harder, as the magnitude of the output corresponds directly to the predicted property.

For estimating gaze, the goal is to regress the angle of the gaze relative to the camera view. That is, if I is a head crop image of the subject, a function $f(I)$ which predicts $g=f(I)$, the gaze vector is desired. The use of spherical coordinates in expressing the gaze direction vector may be more naturally interpretable in this context. In some embodiments, the spherical coordinates may be defined such that the pole singularities correspond to strictly vertical gaze oriented either up or down which are fairly rare directions.

Referring to predicting the error bounds, a neural network to predict each quantile separately is an option, however, that would require too much computation for the present problem. Hence, a single network to predict both the mean value and the 90% and 10% quantile was developed. With this approach, the model can estimate both the expected gaze direction and a set of error bounds in a single forward pass.

In some embodiments, the model for the error bounds is based on two assumptions. First, it is assumed that the quantiles for 10% and 90% are symmetric with respect to the expected value. Second, it is assumed that the distribution is isotropic in the spherical coordinate system. This assumption may be less accurate for large pitch angles due to the space distortion around pole singularities. However, for most of the observed gaze directions this results in a reasonable approximation to reduce the dimensionality of the problem and simplify the interpretation of the result.

The gaze direction vector 240 output of the neural network 200 may be expressed as $f(I)=(\theta, \phi, \sigma)$, where $(\theta, \phi)$ is the expected gaze direction in spherical coordinates, for which a corresponding ground truth gaze vector in the eye coordinate system g (e.g. the data collection system) may expressed as $\theta=-\arctan g_x/g_z$ and $\phi=\arcsin g_y$. The third parameter, $\sigma$, corresponds to the offset from the expected gaze such that $\theta+\sigma$ and $\phi+\sigma$ are the 90% quantiles of their distributions while $\theta-\sigma$ and $\phi-\sigma$ are the 10% quantiles. Finally, the system 100 (e.g., the computing device) computes the pinball loss of this output. This computation will naturally force $\phi$ and $\theta$ to converge to their ground truth values and a to the quantile difference. If $y=(\theta gt; \phi gt)$, the loss $L_{96}$ for the quantile $\tau$ and the angle $\theta$ can be written as (Eq. 1 or Eq. 2):

$$\hat{q}_\tau = \begin{cases} \theta_{gt} - (\theta - \sigma), & \text{for } \tau \leq 0.5 \\ \theta_{gt} - (\theta + \sigma), & \text{otherwise} \end{cases} \quad \text{(Eq. 1)}$$

$$L_\tau(\theta, \theta_{gt}) = \max(\tau \hat{q}_\tau, -(1-\tau)\hat{q}_\tau) \quad \text{(Eq. 2)}$$

A similar formulation is used for the angle $\phi$. An average of the losses for both angles and quantiles $\tau=0:1$ and $\tau=0:9$ is determined. Thus, $\sigma$ is a measure of the difference between the 10% and 90% quantiles and the expected value.

Still referring to FIG. 2, in operation, for example in an application mode, a computing device 130 may implement the neural network 200. The computing device 130 may receive image data of one or more subjects from a camera 140. The computing device 130, utilizing the neural network 200, analyzes the image data captured by the camera 140. The neural network 200 is trained on training data (e.g., annotated training image data) comprising training image data of one or more subjects and corresponding training gaze direction vectors. The annotated training image data may be generated by collecting image data using a 360-degree panoramic camera of one or more subjects where gazes of the one or more subjects are fixed on a visual target that is moved about an environment and calculating a corresponding training gaze direction vectors corresponding to the gazes of the one or more subjects. This process will be described in more detail with reference to FIGS. 3 and 4. The computing device 130, utilizing the neural network 200, predicts a gaze direction vector of the subject with the neural network and in some instances also predicts error bounds based on a pinball loss function.

Figure 3:
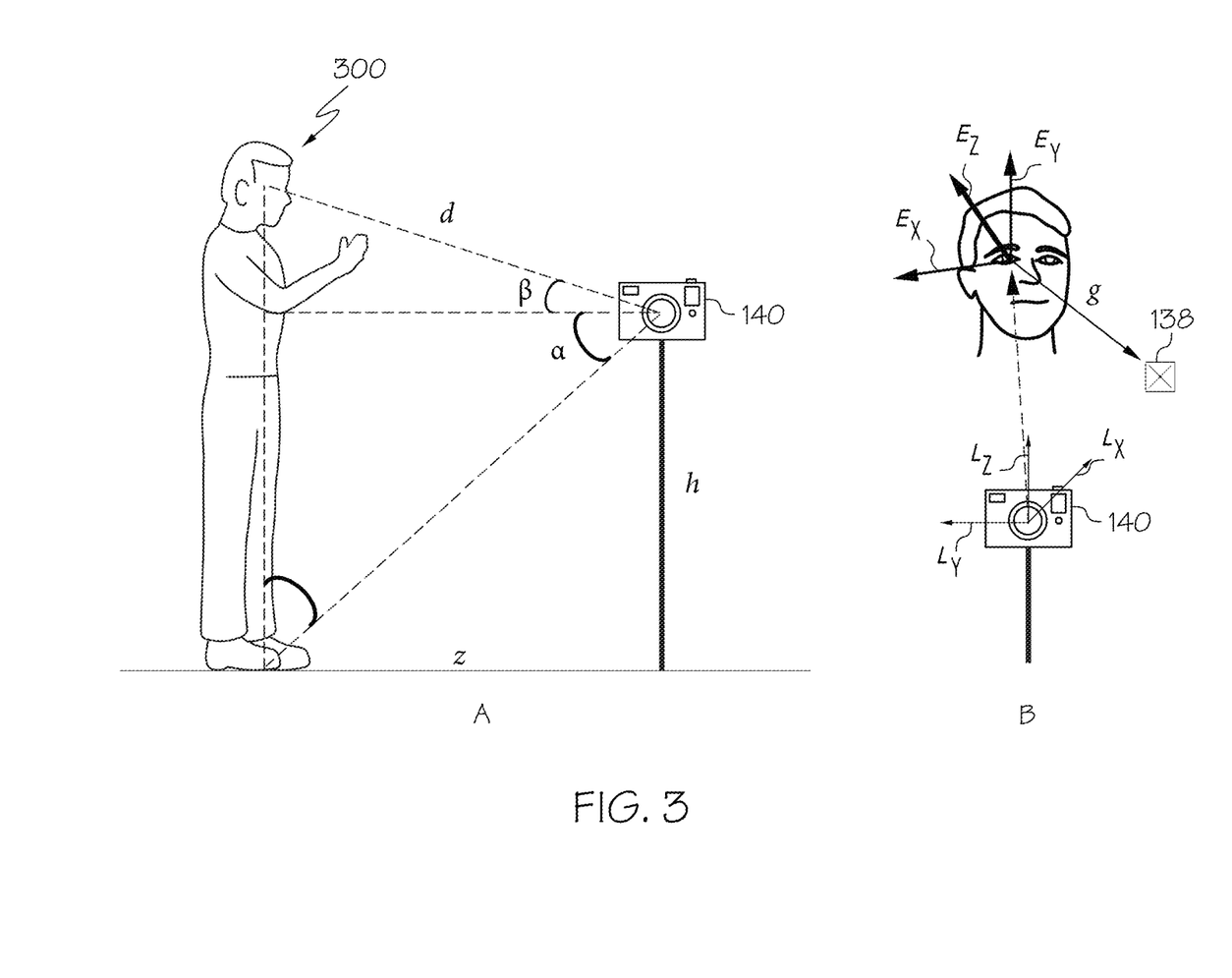
FIG. 3 depicts an illustrative image data collection configuration having a camera and a subject according to one or more embodiments shown and described herein.
Figure 4:
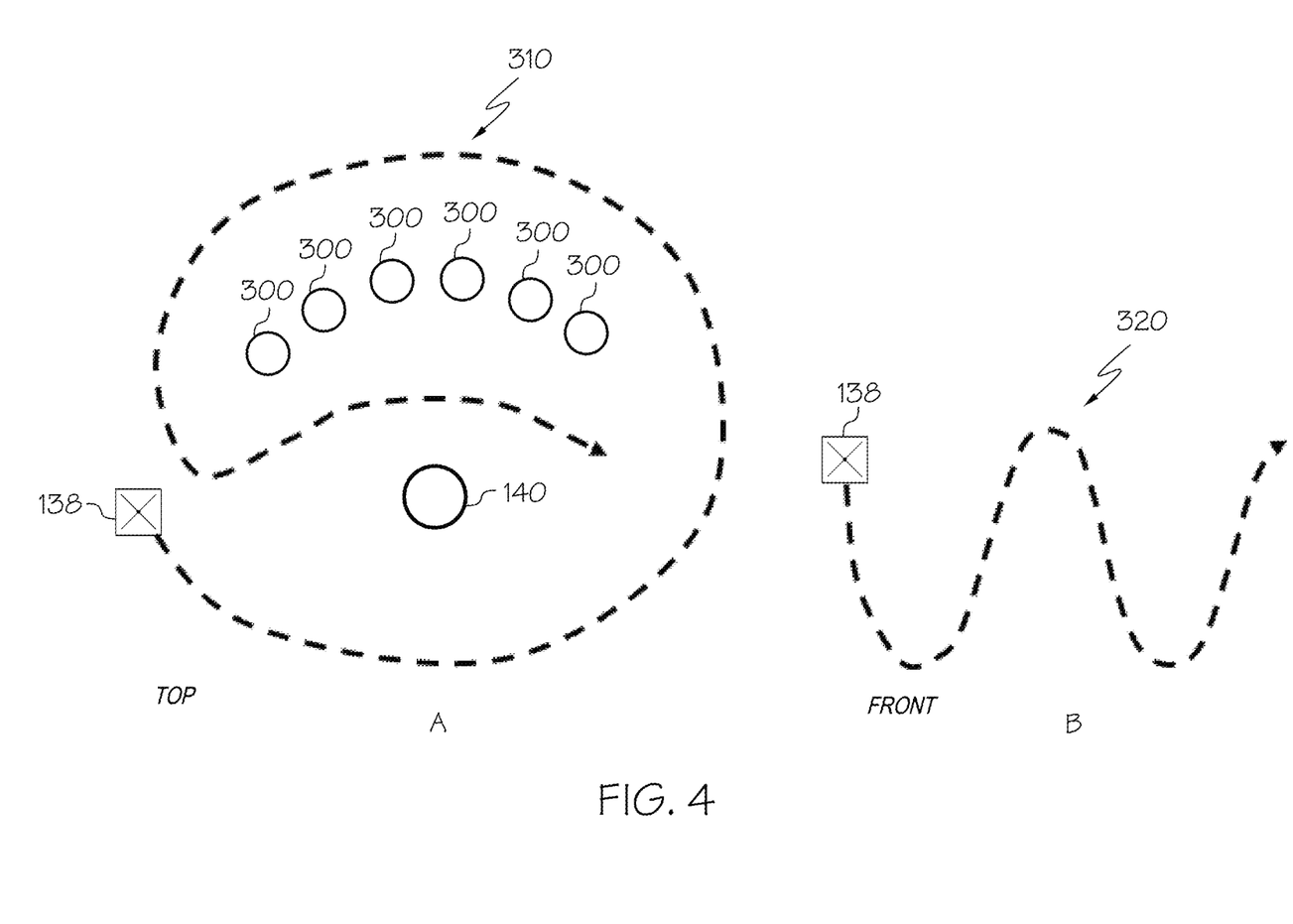
FIG. 4 depicts illustrative views of an example path a visual target may traverse to capture various gazes from the one or more subjects in the environment that are tracking the visual target according to one or more embodiments shown and described herein.

Turning to FIGS. 3 and 4, an illustrative configuration for collecting data in-the-wild according to embodiments described herein is depicted. In particular, FIG. 3 depicts an illustrative image data collection configuration having a camera 140 and a subject 300. As disclosed above, the camera 140 for data collection may be a 360-degree panoramic camera. The camera 140 may be position on a tripod at a height (h), for example around head height of the subject 300 in the middle or near the center of the scene. It is understood that the height (h) of the camera could be varied but during the data collection process the height (h) is fixed. By positioning the camera 140 in the middle of the environment, recording of multiple subjects 300 distributed around the device at the same time may be achieved. To obtain a continuous annotation of the gaze direction, the subjects 300 are instructed to fixate on and track the focus target 138B on the visual target 138 marked with a registration tag 138A that is visible to the camera 140 (See FIG. 1 for illustration of 138A and 138B). The compactness of the setup, consisting of optionally a single camera 140 on a tripod together with a computing device 130 and portable power source allow for easy portability and deployment both indoors and outdoors. This can enable fast acquisition of a large pool of subject 300, efficient gaze annotation in 3D and large variety in environment and illumination.

The camera 140, for example, a 360-degree panoramic camera may contain five synchronized and overlapping multi-megapixel camera units each with a 120° horizontal field of view, plus one additional upward facing camera unit which may not be used depending on the orientation of the camera 140. A subject 300 standing at a predefined and fixed distance away from the camera will be fully captured in at least one of the views which remedies a need for image stitching that would otherwise introduce visual artifacts. The predefined distance may be 1 meter, 2 meters, 5 meters, or any other distance where the full body or at least the upper torso of the subject 300 is captured by one of the camera units of the camera 140. In some instances each individual image frame is rectified after capture to remove the barrel distortion.

The pose of the subject may be determined using one or more known pose estimation methods. For example, a pose estimation method, AlphaPose, may be used to estimate 2D poses of subjects 300 in rectified frames from each camera unit independently. Such a method detects the position of head features and feet of the subjects 300. Average body proportions of standing subjects may be used to estimate their feet position from their hip position if their feet are out of the camera field of view for very close subjects. FIG. 3 depicts schematic A, a diagram depicting the components for estimating the subject's eye distance from the camera and schematic B depicting the components of the conversion of the camera 140 coordinate system to the gaze coordinate system. The camera 140 provides a 3D ray in a global camera Cartesian coordinate system $L=[L_x;L_y;L_z]$ (FIG. 3, B) for every image pixel. This is used to derive the position of feet and eyes in spherical coordinates (angles $\alpha$ and $\beta$ in the 2D slice presented in FIG. 3, A). The remaining unknown variable is the distance to eyes d. This may be determined based on a function of the camera height (h) above the ground plane and an assumption that both the camera and all subjects stand on the same horizontal plane. Although this may limit the training data collection to flat surfaces, it is not restrictive at test-time. Using trigonometry the horizontal distance between the camera base and subject's feet z and finally the distance between the camera and the subject's eyes d is computed. Eqs. 3 and 4 below depict the trigonometry functions corresponding to the schematic of FIG. 3.

$$z = h*\tan\left(\frac{\pi}{2} - \alpha\right).\qquad\text{Eq. 3}$$

$$d = z*\tan\beta.\qquad\text{Eq. 4}$$

From here the position of the eyes may be converted to the camera coordinate system L as $p_e$ for further computation.

Regarding positioning of the visual target 138, an image recognition system and method, such as the AprilTag library, may be used to detect the marker in each of the camera views and estimate its 3D pose using the known camera calibration parameters and predefined dimensions of the visual target 138. The pose and known visual target 138 geometry are then used to find the 3D location of the focus target $p_t$. The visual target 138 includes a registration tag 138A and/or a focus target 138B, as depicted and described with reference to FIG. 1. The focus target 138B serves as a gaze fixation target for the study subjects 300 while the tag is used for tracking of the visual target 138 in 3D space.

Once both the subject eyes and focus target 3D positions are expressed in the common camera coordinate system, the gaze direction vector may be computed as a simple difference: $g_L=p_t-P_e$. However, such a form would change with rotation of the camera and its coordinate system L. To remove this, the gaze is expressed in the observing camera's Cartesian eye coordinate system as $E=[E_x;E_y;E_z]$ (FIG. 3, right). E is defined so that the origin is $p_e$, $E_z$ has the same direction as $g_L$ and $E_x$ lies in a plane defined by $L_x$ and $L_y$ (no roll). The gaze vector may then be converted to the eye coordinate system as Eq. 5, below:

$$g = E*\frac{g_L}{\|g_L\|_2}.\qquad\text{Eq. 5}$$

This definition of gaze direction guarantees that g=[0; 0; −1] when the subject looks directly at the camera, independently of the subject's position, and in general allows the gaze orientation to be expressed from the local appearance of the head without the need for any global context.

Turning to FIG. 4, an example path a visual target 138 may traverse to capture various gazes from the one or more subjects 300 in the environment that are tracking the visual target 138 is depicted. As depicted for example, the subjects 300 were instructed to stand around a camera 140 at the distance between 1 and 3 meters (mean distance 2:2 m) and continuously track the focus target 138B on the side of the visual target 138 visible to them. Referring to FIG. 4, schematic A, top-down view of a scene and target board trajectory is depicted. Referring to FIG. 4, right schematic, a side view of the scene and vertical trajectory of the visual target 138 is depicted. That is, as the visual target 138 is moved about an environment and around the subjects 300, the elevation of the visual target 138 with reference to the ground may vary to capture gazes in the upward and downward directions (e.g., path 320).

As depicted in FIG. 4, the visual target 138 was manipulated by an investigator who carried it along the path 310 in a large loop around both the subjects and the camera (e.g., at a 2 to 5 meter radius) and then in between the camera and subjects. The elevation of the visual target 138 was at the same time cyclically changed up and down. The loop part of the path 310 allowed the camera to capture both front and rear facing gaze directions. The inner path was added to sample more extreme vertical directions which can only be achieved from a closer distance due to limitations on the vertical position of the visual target 138 in the scene. The registration tag 138A remained visible and as front-to-parallel with the camera 140 as possible to reduce pose estimation error.

In some instances, in order to capture a wide range of relative eyeball and head poses, the subjects 300 received alternating instructions to "move" or "freeze" during each capture. While in the "move" state, subjects 300 were allowed to naturally orient their head and body pose to help track the visual target 138. When the "freeze" instruction was issued, subjects were only allowed to move their eyes. It is noted that the "freeze"-"move" procedure succeeded in sampling the space of relative eye movement independent on head pose which prevents the problem from collapsing to head pose estimation.

In some embodiments, while the generation of ground truth gaze labels is fully automatic, additional steps may be implemented to ensure that the dataset was clean, by removing any false and unreliable subject and target detections from the data. The process may include, first, detecting the registration tag 138A for every frame and discarded frames where the detection failed due to occlusion or illumination issues. Next, all the people in the image were detected using a pose estimation method such as AlphaPose and their body skeletons were used to estimate head bounding boxes. A simple tracker based on head bounding box intersection is used to assign identities to subjects across as many frames per camera unit as possible. In some instances, the mean distance of each identity from the visual target 138 was computed. The identities of subjects positioned closer to the target than a predefined distance (e.g., 1.2 m) on average were removed since they corresponded to the investigator manipulating the board. Additionally, the image data could be thresholded so that any persons beyond 3.5 m from the camera, for example those consisting of passers-by or other members of the data collection team were removed as training subjects. A step of confirming that the detected head bounding box was within the valid part of the rectified image data may also be implemented to remove partially-detected subjects whose heads were outside the rectified image. Finally, a visual inspection of two or more uniformly sampled frames for each detected identity may be implemented where those that did not belong to the pool of subjects 300 were removed.

It should now be understood that the systems and methods described herein generate a unique dataset through the combination of high quality 3D gaze annotations, a wide range of gaze and head poses, and a variety of indoor and outdoor capture environments and diversity of subjects.

Figure 5:
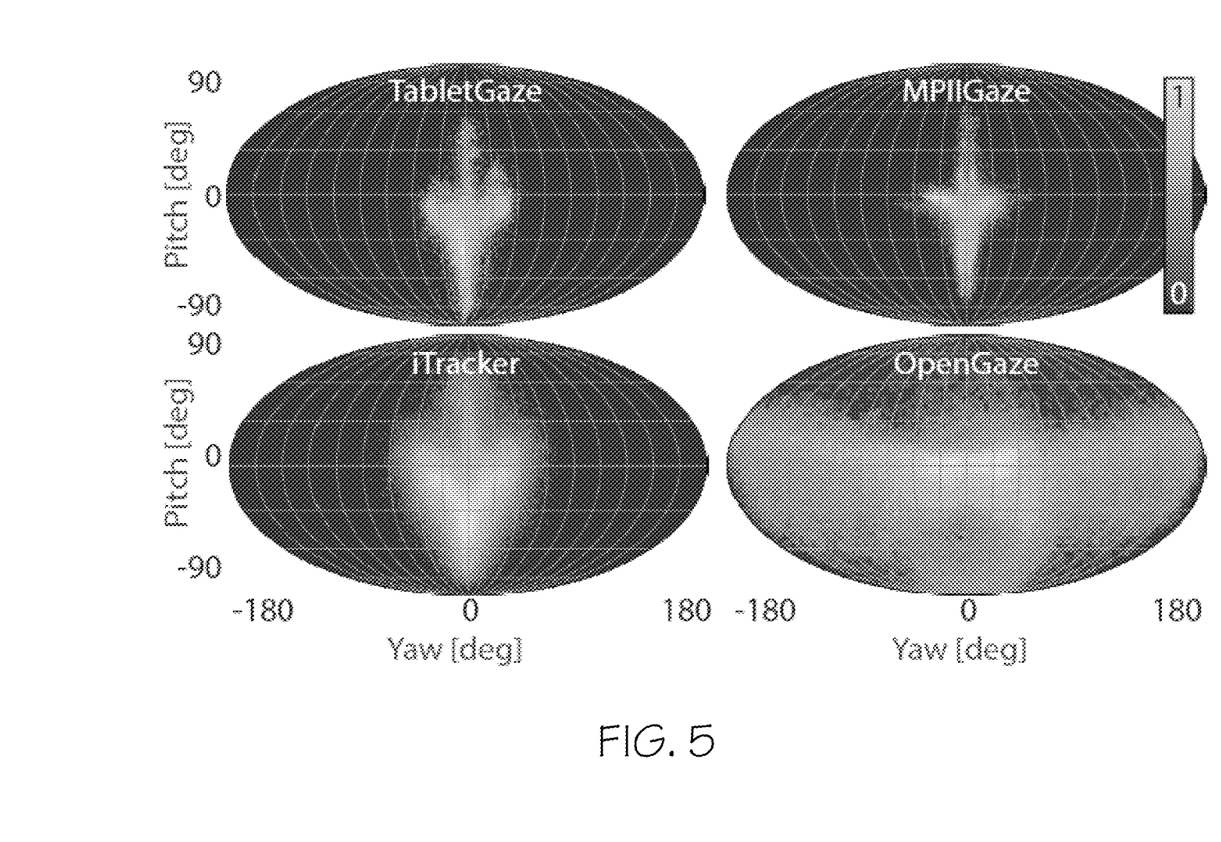
FIG. 5 depicts Mollweide projections for joint distributions of the gaze yaw and pitch for datasets according to one or more embodiments shown and described herein.

Referring to FIG. 5, dataset statistics are depicted. FIG. 5 is a plot of the angular distributions of the gaze labels covered by the gaze model ("OpenGaze") disclosed herein and several other datasets using the Mollweide projection. That is, the joint distributions of the gaze yaw and pitch for TabletGaze, MPIIGaze, iTracker and OpenGaze datasets are shown. All intensities are logarithmic. This illustrates how the OpenGaze dataset covers the entire horizontal range of 360. While a portion of these gaze orientations correspond to fully occluded eyes (facing away from the camera), the OpenGaze dataset allows for gaze estimation up to the limit of eye visibility. This limit can, in certain cases, correspond to gaze yaws of approximately ±140° (where the head pose is at 90° such that one eye remains visible, and that eye is a further 50° rotated).

It should now be understood that embodiments described herein are directed to systems and methods for collecting precise and highly varied gaze data for training neural networks to predict a gaze of a subject. Additionally, embodiments described herein include systems and methods of generating 3D gaze training data for training a neural network which includes image data of subjects in an uncontrolled environment and corresponding gaze direction vector data that is automatically calculated. Embodiments also include systems and methods that employ a trained neural network to predict a gaze direction vector of a subject within received image data as well as predicting error bounds for the prediction. A pinball loss function is utilized for estimating gaze uncertainty bounds within the neural network. This is shown to be useful to estimate the likelihood of gaze fixation on particular objects in the environment (e.g., the scene of the image data).

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system comprising:
   a camera positioned in an environment to capture image data of a subject;
   a computing device communicatively coupled to the camera, the computing device comprising a processor and a non-transitory computer-readable memory; and
   a machine-readable instruction set stored in the non-transitory computer-readable memory that causes the computing device to perform at least the following when executed by the processor:
      receive the image data from the camera;
      analyze the image data captured by the camera using a neural network trained on training data generated from a 360-degree panoramic camera configured to collect image data of a study subject and a visual target that is moved about the environment; and predict a gaze direction vector of the subject with the neural network.

2. The system of claim 1, wherein the machine-readable instruction set stored in the non-transitory computer-readable memory further causes the system to perform the following when executed by the processor:
predict, with the neural network, error bounds based on a pinball loss function.

3. The system of claim 2, wherein the error bounds comprise at least one of a mean value, a 90% quantile value, or a 10% quantile value.

4. The system of claim 1, wherein the predicted gaze direction vector is defined by a spherical coordinate system.

5. The system of claim 1, wherein the predicted gaze direction vector comprises a three-dimensional gaze vector.

6. The system of claim 1, wherein the training data comprises training image data of one or more subjects and corresponding training gaze direction vectors generated by:
collecting image data using a 360-degree panoramic camera of the one or more subjects where gazes of the one or more subjects are fixed on the visual target that is moved about the environment, and
calculating a corresponding training gaze direction vectors corresponding to the gazes of the one or more subjects.

7. The system of claim 1, wherein image data is a head shot of the subject.

8. The system of claim 1, wherein the neural network comprises one or more convolution layers and one or more fully connected layers.

9. The system of claim 1, wherein the image data received by the processor comprises an image size of at least one of the following: 128×128, 227×227, and 384×384.

10. A method comprising:
receiving image data from a camera positioned in an environment to capture image data of a subject;
analyzing the image data with a neural network trained on training data generated from a 360-degree panoramic camera configured to collect image data of a study subject and a visual target that is moved about the environment; and
predicting a gaze direction vector of the subject with the neural network.

11. The method of claim 10, further comprising:
predicting, with the neural network, error bounds based on a pinball loss function.

12. The method of claim 11, wherein the error bounds comprise at least one of a mean value, a 90% quantile value, or a 10% quantile value.

13. The method of claim 10, wherein the predicted gaze direction vector is defined by a spherical coordinate system.

14. The method of claim 10, wherein the predicted gaze direction vector comprises a three-dimensional gaze vector.

15. The method of claim 10, wherein the training data comprises training image data of one or more subjects and corresponding training gaze direction vectors generated by:
collecting image data using a 360-degree panoramic camera of the one or more subjects where gazes of the one or more subjects are fixed on the visual target that is moved about the environment, and
calculating a corresponding training gaze direction vectors corresponding to the gazes of the one or more subjects.

16. The method of claim 10, image data is a head shot of the subject.

17. The method of claim 10, wherein the neural network comprises one or more convolution layers and one or more fully connected layers.

18. The method of claim 10, wherein the image data comprises an image size of at least one of the following: 128×128, 227×227, and 384×384.

19. A system comprising:
a camera positioned in an environment to capture image data of a subject;
a computing device communicatively coupled to the camera, the computing device comprising a processor and a non-transitory computer-readable memory;
a machine-readable instruction set stored in the non-transitory computer-readable memory that causes the computing device to perform at least the following when executed by the processor:
receive the image data from the camera;
analyze the image data captured by the camera using a neural network trained on training data comprising training image data of the one or more subjects and corresponding training gaze direction vectors generated by:
collecting image data using a 360-degree panoramic camera of one or more subjects where gazes of the one or more subjects are fixed on a visual target that is moved about the environment, and
calculating a corresponding training gaze direction vectors corresponding to the gazes of the one or more subjects;
predict, with the neural network, a gaze direction vector of the subject with the neural network; and
predict, with the neural network, error bounds based on a pinball loss function.

20. The system of claim 19, wherein the error bounds comprise at least one of a mean value, a 90% quantile value, or a 10% quantile value.

* * * * *

UNITED STATES PATENT AND TRADEMARK OFFICE
CERTIFICATE OF CORRECTION

| | | |
|---|---|---|
| PATENT NO. | : 11,221,671 B2 | Page 1 of 1 |
| APPLICATION NO. | : 16/744719 | |
| DATED | : January 11, 2022 | |
| INVENTOR(S) | : Stent et al. | |

It is certified that error appears in the above-identified patent and that said Letters Patent is hereby corrected as shown below:

In the Specification

In Column 10, Line(s) 48, delete "$L_{96}$" and insert --$L_\tau$--, therefor.

Signed and Sealed this
Twenty-second Day of February, 2022

Drew Hirshfeld
*Performing the Functions and Duties of the*
*Under Secretary of Commerce for Intellectual Property and*
*Director of the United States Patent and Trademark Office*